US006846988B2

(12) United States Patent
Khemakhem et al.

(10) Patent No.: US 6,846,988 B2
(45) Date of Patent: Jan. 25, 2005

(54) TRIAXIAL CONNECTOR INCLUDING CABLE CLAMP

(75) Inventors: M'hamed Anis Khemakhem, Eden Prairie, MN (US); Jim Kerekes, Waterville, MN (US); Michael John Shorter, Lonsdale, MN (US)

(73) Assignee: ADC Telecommunications, Inc., Eden Prairie, MN (US)

(*) Notice: Subject to any disclaimer, the term of this patent is extended or adjusted under 35 U.S.C. 154(b) by 271 days.

(21) Appl. No.: 10/052,580

(22) Filed: Jan. 18, 2002

(65) Prior Publication Data

US 2003/0135999 A1 Jul. 24, 2003

(51) Int. Cl.[7] .................................................. H02G 3/18
(52) U.S. Cl. ...................... 174/75 C; 174/65 R; 174/78
(58) Field of Search ................................ 174/75 C, 78, 174/88 C, 65 R, 655 S

(56) References Cited

U.S. PATENT DOCUMENTS

| | | | |
|---|---|---|---|
| 2,642,474 | A | 6/1953 | Bowar |
| 3,673,546 | A | 6/1972 | Green et al. |
| 4,813,887 | A | 3/1989 | Capp |
| 5,573,423 | A | 11/1996 | Lin et al. |
| 5,773,759 | A | 6/1998 | Hablutzel |
| 5,967,852 | A | 10/1999 | Follingstad et al. |
| 6,109,963 | A | 8/2000 | Follingstad et al. |
| 6,146,192 | A | 11/2000 | Cabalka et al. |
| 6,231,380 | B1 | 5/2001 | Cabalka et al. |

FOREIGN PATENT DOCUMENTS

EP 0 167 738 A2 1/1986

OTHER PUBLICATIONS

Kings Electronics Co., Inc., Broadcast Products Catalog 801, pp. 1, 25–37, and 45–50, ©2001.

ADC Telecommuncations, Inc., ProAx™ Triaxial Camera Connector, 8 pages, dated Jun. 1998.

ADC Telecommunications, Inc., Broadcast Products Catalog 9th Edition, front cover, pp. 100–105, and rear cover, dated Mar. 2001.

*Primary Examiner*—Chau N. Nguyen
(74) *Attorney, Agent, or Firm*—Merchant & Gould PC

(57) ABSTRACT

The present invention relates to a center conductor insulator with a tapered entry for use with a coaxial cable transmission line connector that provides guiding and centering of a center conductor pin within the connector. The present invention further relates to a front sleeve assembly for use with a coaxial cable transmission line connector which incorporates a center conductor insulator with a tapered entry to guide and center a center conductor pin within the connector. The present invention also relates to a compression ring assembly for mounting a connector to a cable, the assembly having a collet engaging a tapered rear seal to compress the collet about the cable. The present invention further relates to a method of mounting a connector to a cable with a compression ring assembly incorporating a collet and tapered rear seal. The present invention also relates to conversion kit including a front sleeve assembly and an outer body for a coaxial cable transmission line connector which permits the connector to be changed from a connector of first style or gender to a connector of a second style or gender. The present invention further relates to a mounting kit which allows mounting of different genders and styles of telecommunications connectors to a panel.

8 Claims, 22 Drawing Sheets

TRIAXIAL CONNECTOR INCLUDING CABLE CLAMP

FIELD OF THE INVENTION

The present invention relates to transmission line connectors, more specifically to transmission line connectors for connecting to cables including center conductors shielded from one or more longitudinally extending coaxial conductors.

BACKGROUND OF THE INVENTION

Connectors for use with electrically conductive transmission cables provide electrical connectivity with the center conductor of the cable as well as to other coaxially arranged conductors with the cable. Some of these cables include a center conductor and one additional coaxial conductor (coaxial cables) and while others cables include two additional coaxial conductors (triaxial cables). The center conductor of a cable of either type is physically and electrically linked to the center conductor of the connector, and the connector can then be used with a mating connector. U.S. Pat. Nos. 5,967,852 and 6,109,963 to ADC Telecommunications, Inc., concern connectors of this type. Mounting panels for connectors of this type are also known, as shown in U.S. Pat. Nos. 6,146,192 and 6,231,380. Continued development in this area is desired.

SUMMARY OF THE INVENTION

The present invention relates to a center conductor insulator for use in a coaxial cable transmission line connector. The insulator includes a tapered entry for a pin connected with the center conductor of the cable. A front shell assembly for use with a connector includes center conductor insulator with a tapered entry.

The present invention further relates to a compression ring assembly for holding a transmission line connector to a transmission line cable. The assembly includes a compressible collet urged inward by a sloped inner wall of a rear seal. The collet includes slots extending from each end of the collet.

The present invention also relates to a conversion kit for converting a transmission line connector for use with coaxial conductor cable from one gender or style to a different gender or style.

The present application further relates to a mounting kit for mounting transmission line connectors of different styles or genders to a panel including a yoke and an adapter.

DETAILED DESCRIPTION OF THE PREFERRED EMBODIMENT

Figure 1:
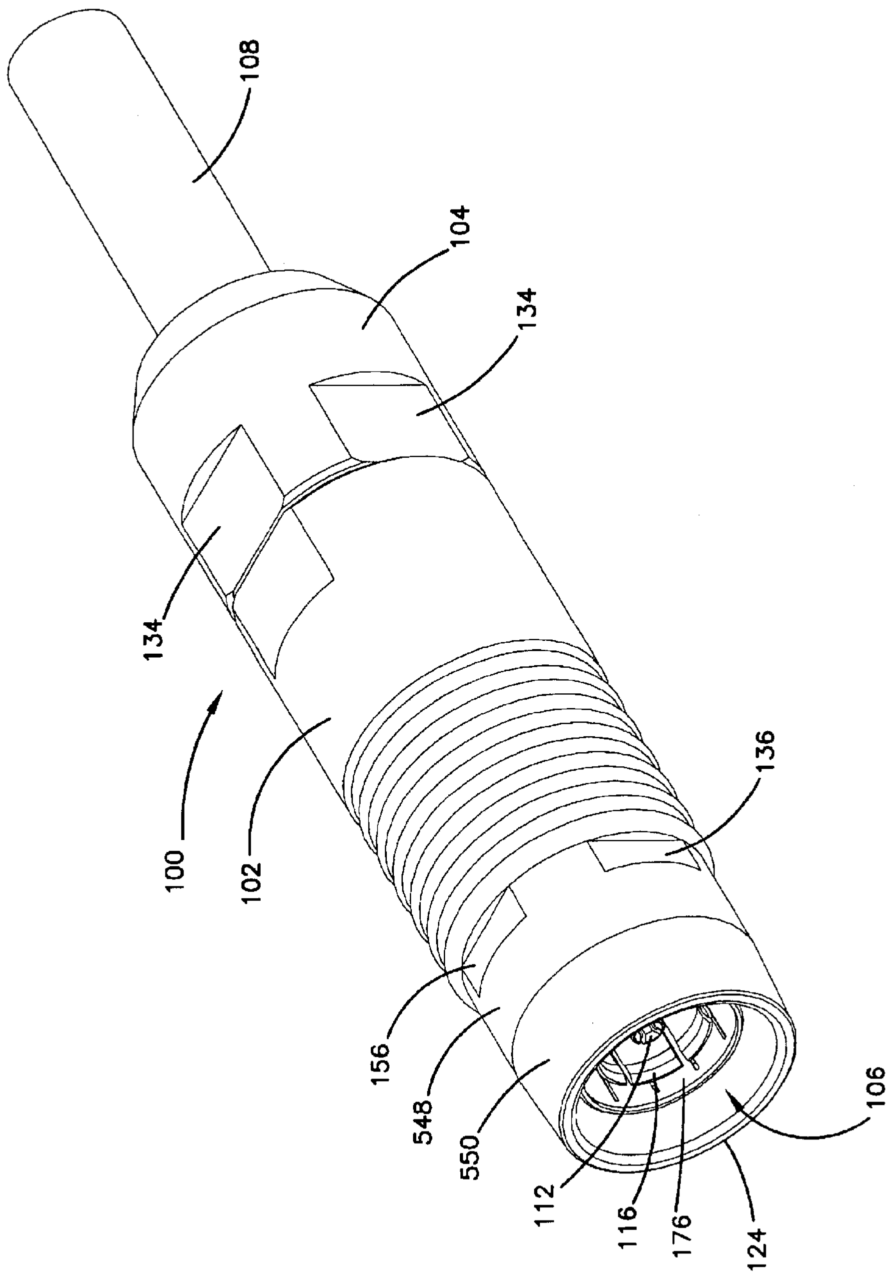
FIG. 1 is a perspective view of a first triaxial connector according to the present invention.

Existing transmission line connectors for connecting to cables with a center conductor and one or more coaxially arranged conductors are well known. While these connectors are typically either for connecting for cables with a single coaxial conductor (coaxial connectors) or with two coaxial conductors (triaxial connectors) similar improvements may be made which are applicable to both types of connectors, and other connector types not coaxial in nature.

Several styles for the size and configuration of connectors exist. The style may differ between the male/female nature of the center conductors and the sleeves of the connectors. The styles may also differ in terms of the locking mechanisms which hold the connectors together. Two styles of connectors are illustrated in the drawings FIGS. 1 and 2 and FIG. 38. These styles differ with respect to the male/female nature of the connector elements and in the locking mechanism.

Typically, two styles of connectors cannot be used together. One aspect of the present invention relates to converting from one style of connector to another style of connector. Various other aspects of the present invention relate to mounting connectors to cables with a cable clamp. Other aspects of the present invention relate to the connector elements including the center conductor insulator. Still further elements of the present invention relate to the use of the connectors with mounting panels.

Figure 3:
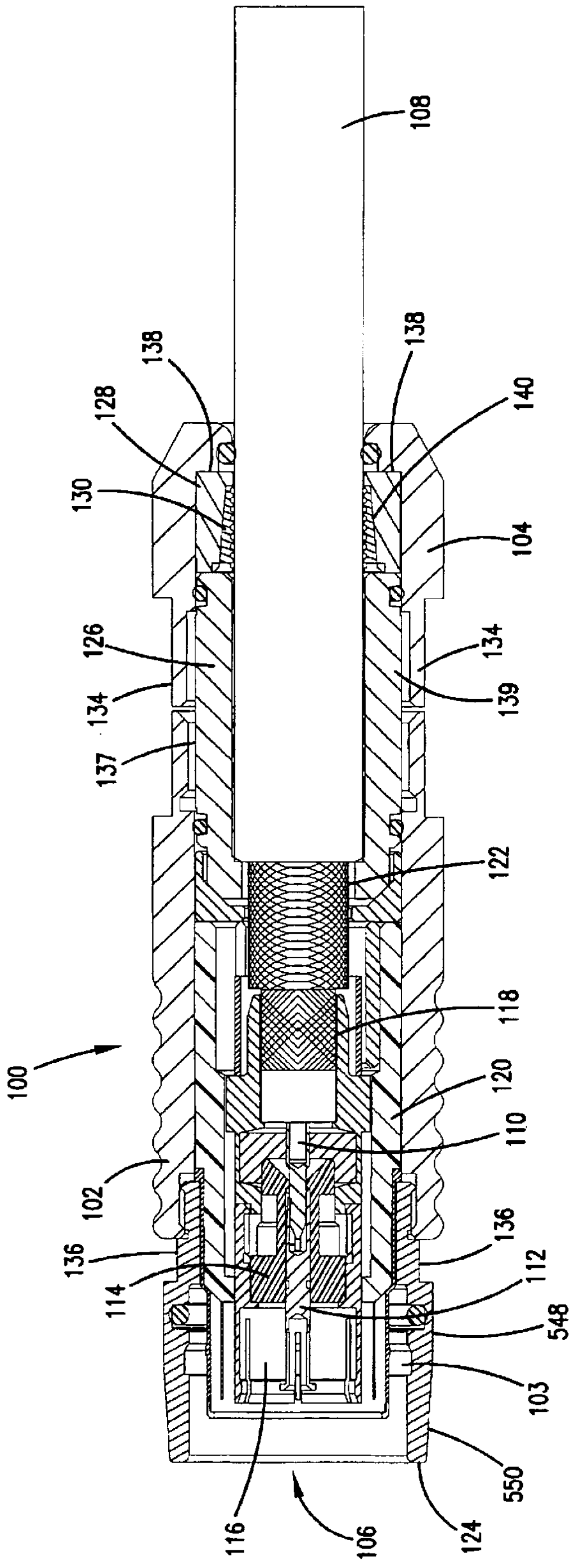
FIG. 3 is a cross-sectional view of the connector of FIG. 1.

Referring now to FIGS. 1 and 3, a first triaxial connector 100 is shown, including a front outer body 102, an endcap 104, a mating opening 106 and a cable 108. Cable 108 includes a center conductor 109 electrically linked to a jack center conductor 112 by center conductor pin 110. Center conductor 112 is held within a center conductor insulator 114 within a front shell 116. Front shell 116 is electrically linked to a first coaxial conductor 118 within cable 108. Outer insulator 120 electrically isolates front shell 116 from front outer body 102, which is electrically linked to a second coaxial conductor 122 within cable 108. Front outer body 102 includes a front ring 124 which defines the entrance to mating opening 106. Endcap 104 is threadably mounted to a threaded insert 126. Captured between endcap 104 and threaded insert 126 are a rear seal 128 and a collet 130 which cooperate to hold connector 100 to cable 108. On endcap 104 are two pairs of opposing wrench flats 134 and on front outer body 102 are two pairs of opposing mounting flats 136. A first water seal such as o-ring 141 is located between cable 108 and endcap 104 and a second water seal such as o-ring 141 is located between threaded insert 126 and endcap 104. A third water seal such as o-ring 141 is located between threaded insert 126 and front outer body 102.

Figure 2:
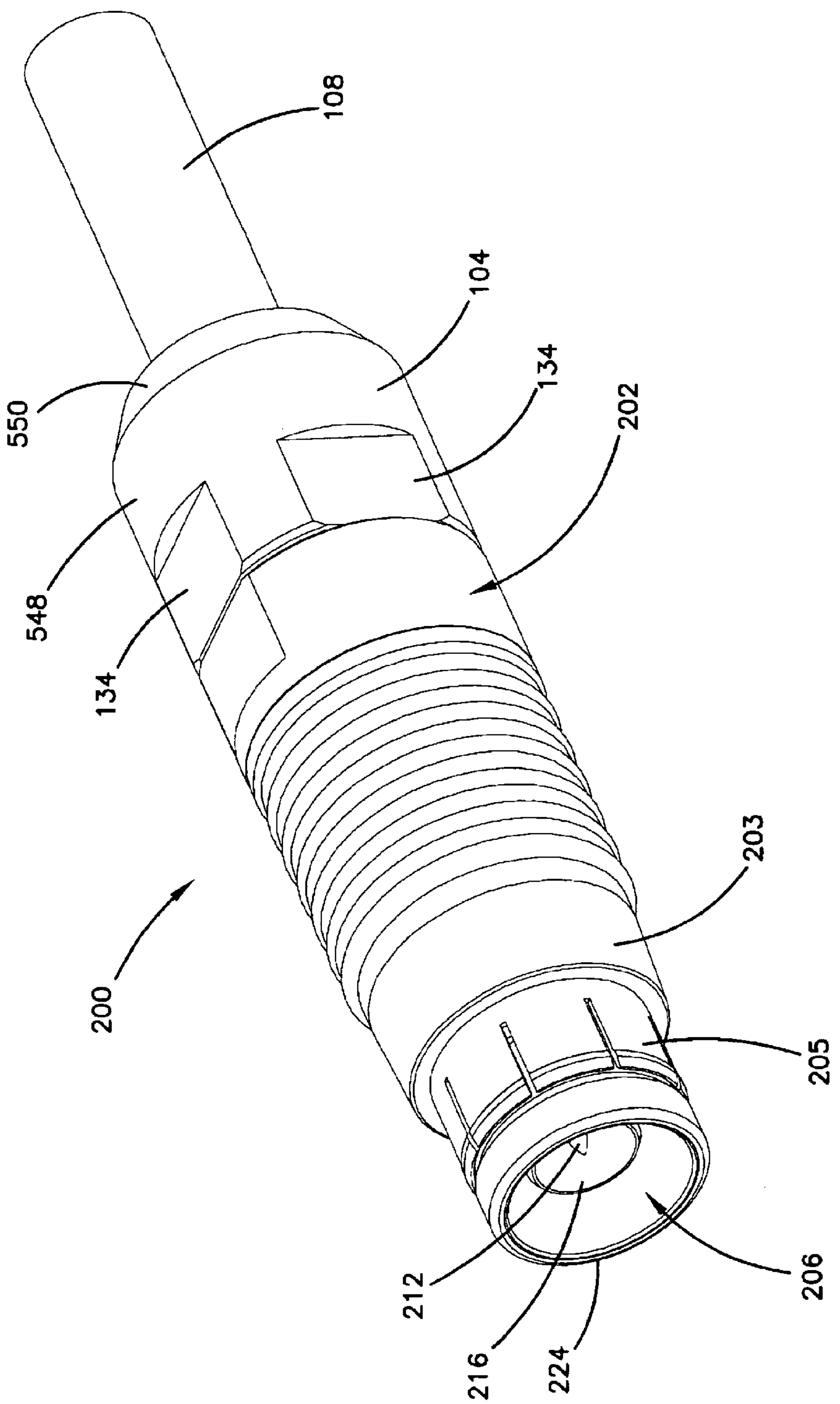
FIG. 2 is a perspective view of a second triaxial connector according to the present invention and adapted to mate with the connector of FIG. 1.
Figure 4:
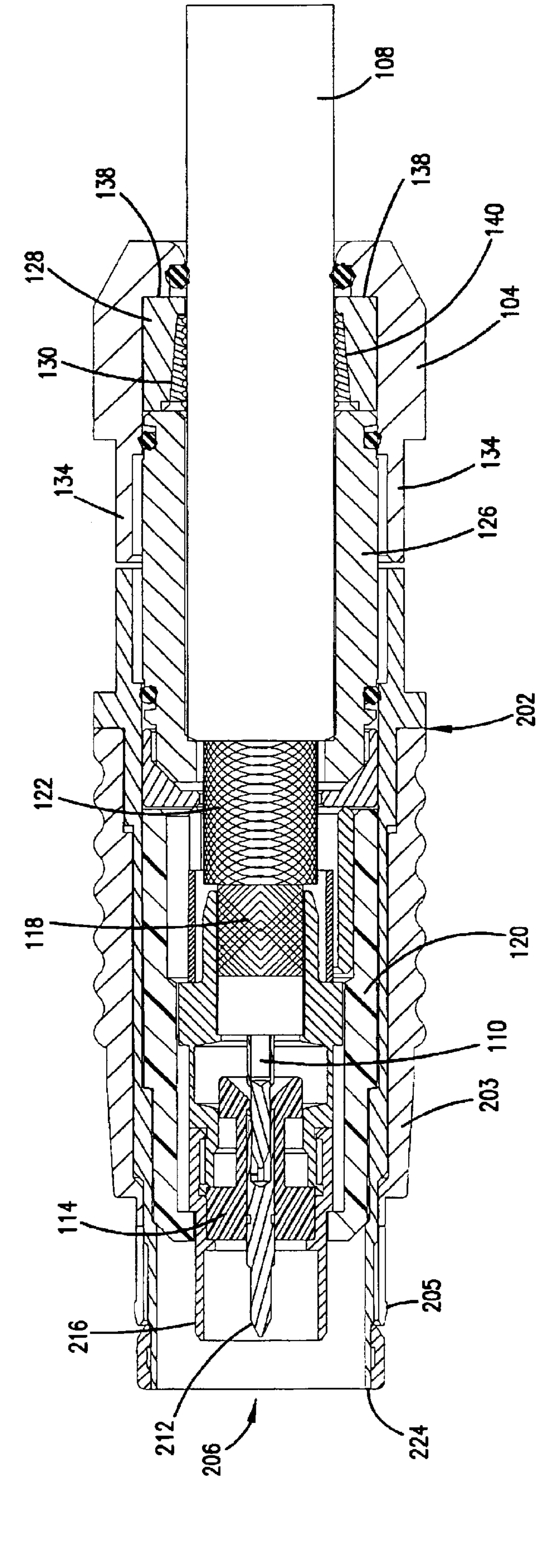
FIG. 4 is a cross-sectional view of the connector of FIG. 2.

Referring now to FIGS. 2 and 4, a second triaxial connector 200 is shown, with a front outer body 202, an endcap 104, a mating end 206 and a cable 108. On front outer body 202 is a sliding lock sleeve 203. Lock sleeve 203 includes a releasable locking mechanism 205 that engages lock ring 103 and is similar to that in U.S. Pat. No. 3,160,457, the disclosure of which is incorporated herein by reference. Fingers 207 release from lock ring 103 when the connectors are pulled apart. If tension is applied to cables 108, ramp 209 tends to prevent fingers 207 from releasing lock ring 103.

Cable 108 includes a center conductor 109 electrically linked to center conductor pin 110. Center conductor pin 110 is electrically linked to a center conductor 212 of held within a center conductor insulator 114 within a front shell 216. Front shell 216 is electrically linked to a first coaxial conductor 118 within cable 108. Outer insulator 120 electrically isolates front shell 216 from front outer body 202, which is electrically linked to a second coaxial conductor 122 within cable 108. Front outer body 202 includes a front ring 224 which defines an entrance to mating opening 206. Endcap 104 is threadably mounted to a threaded insert 126. Captured between endcap 104 and threaded insert 126 are a rear seal 128 and a collet 130 which cooperate to hold connector 200 to cable 108. A first water seal such as o-ring 141 is located between cable 108 and endcap 104 and a second water seal such as o-ring 141 is located between threaded insert 126 and endcap 104. A third water seal such as o-ring 141 is located between threaded insert 126 and front outer body 202.

Figure 5:
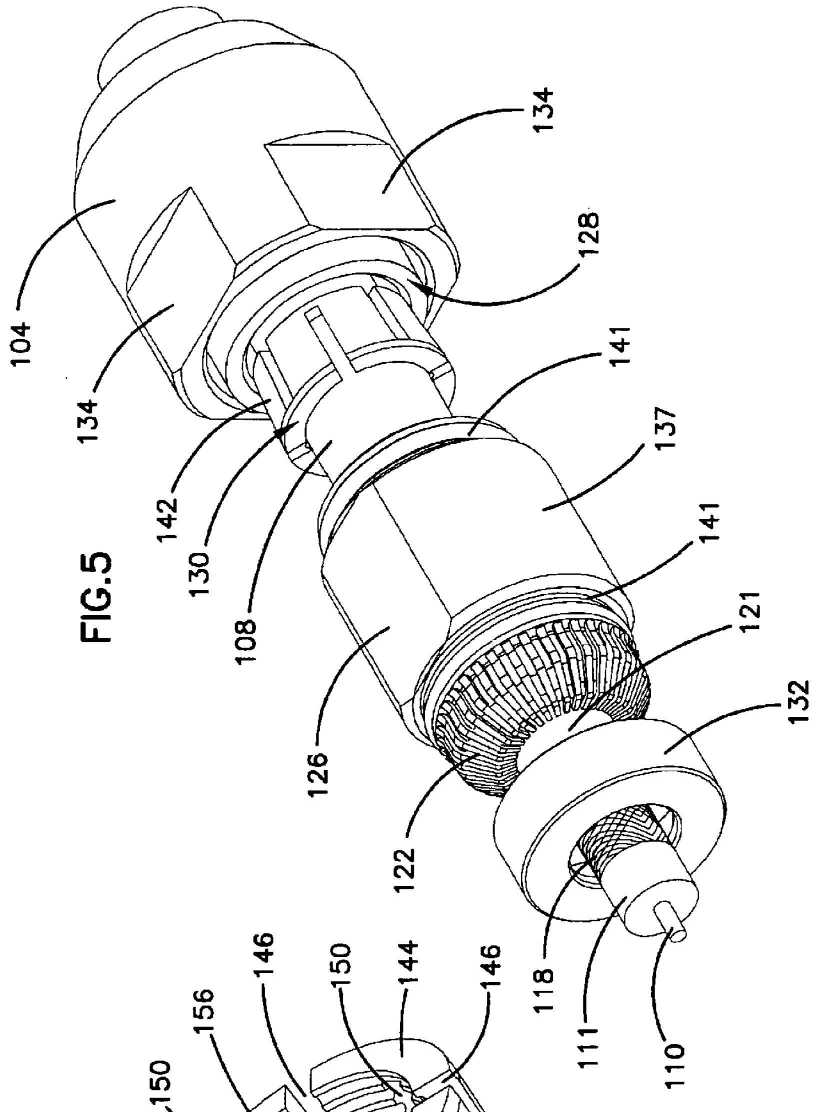
FIG. 5 is an exploded view of some of the internal elements of the cable end of the connector of FIG. 1.
Figure 6:
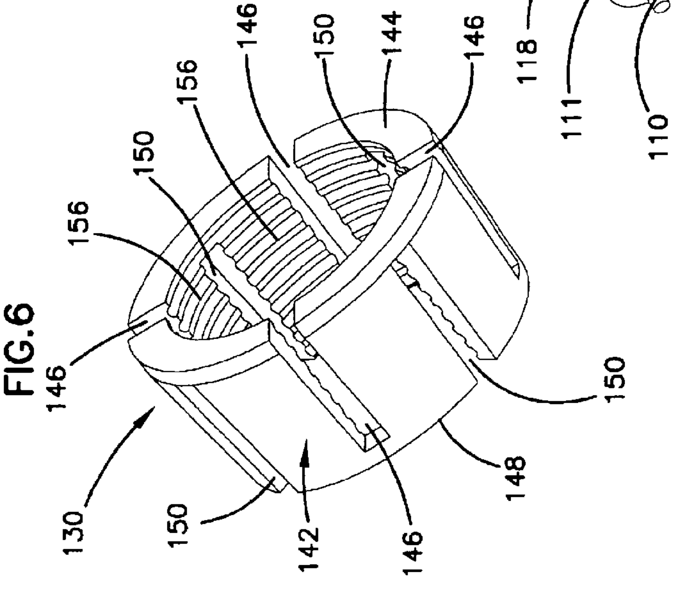
FIG. 6 is a first front perspective view of the collet shown in FIG. 5.
Figure 7A:
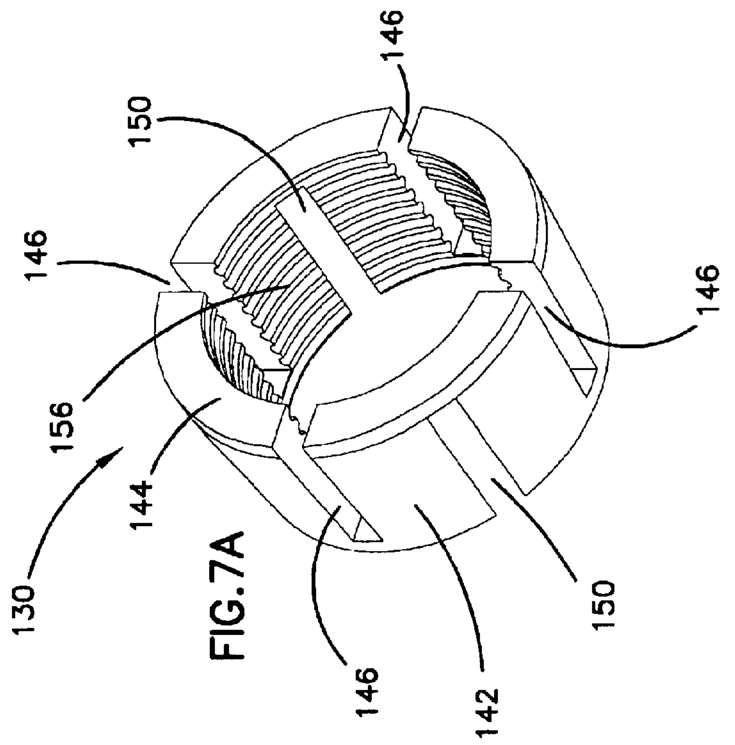
FIG. 7A is a second front perspective view of the collet shown in FIG. 6.
Figure 7:
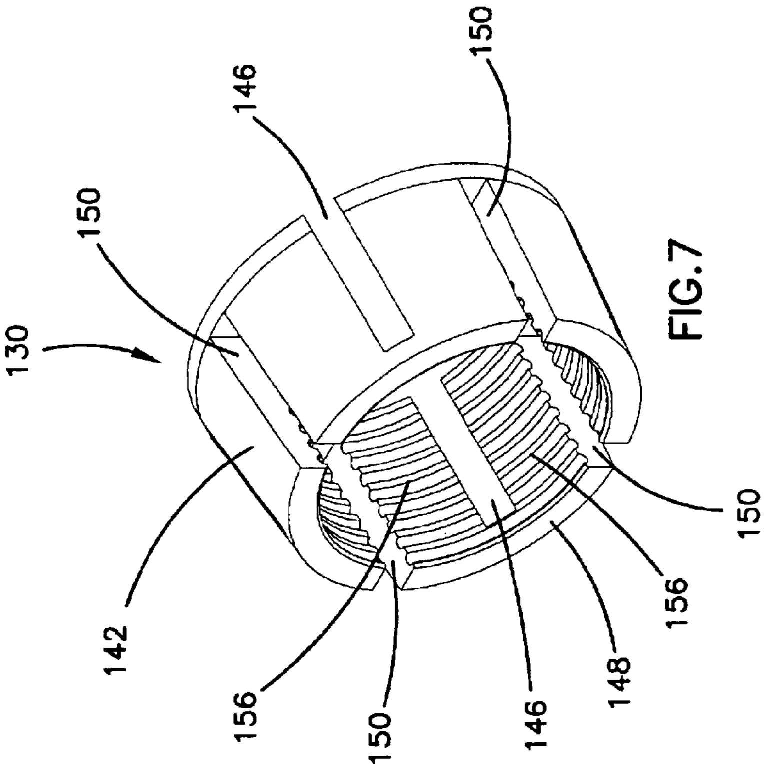
FIG. 7 is a rear perspective view of the collet of FIG. 6.
Figure 10:
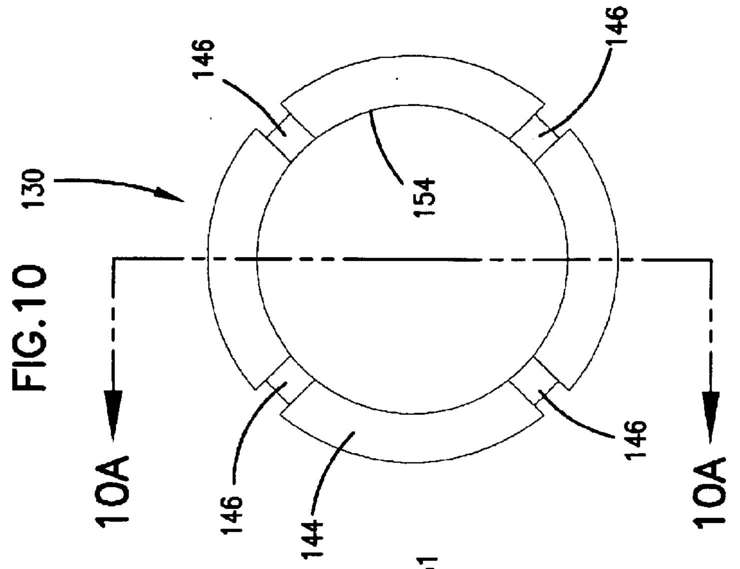
FIG. 10 is a front view of the collet of FIG. 6.
Figure 9:
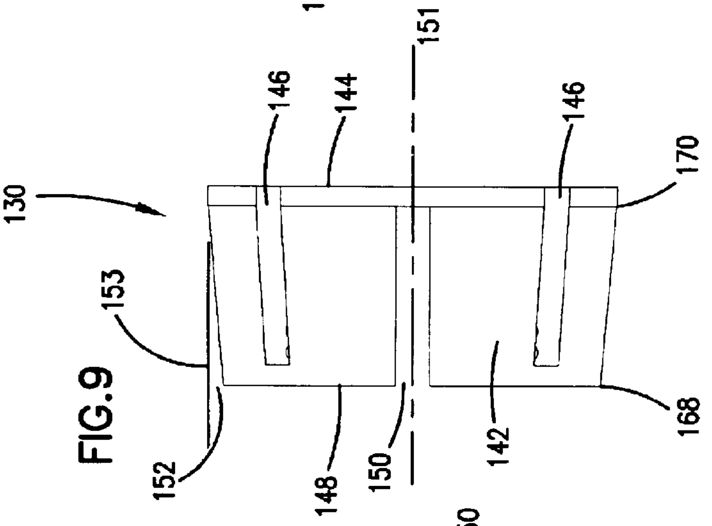
FIG. 9 is a side view of the collet of FIG. 6.
Figure 8:
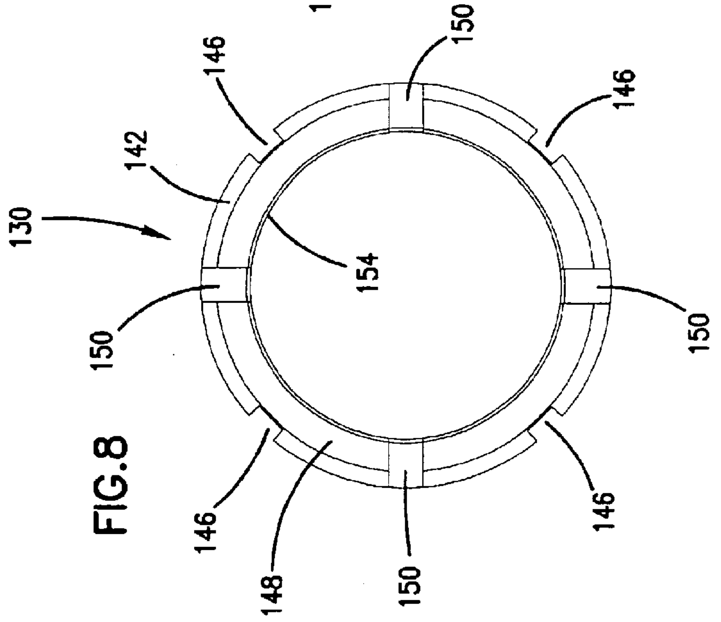
FIG. 8 is a rear view of the collet of FIG. 6.
Figure 10A:
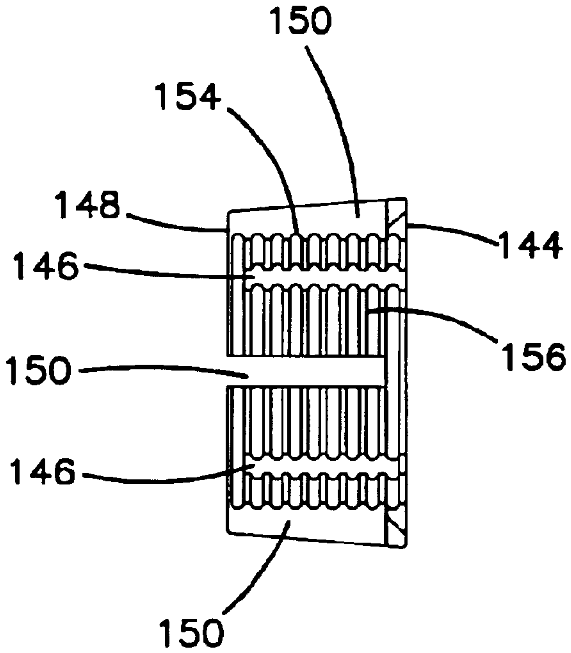
FIG. 10A is a cross-sectional view of the collet of FIG. 6 taken along line A—A in FIG. 10.
Figure 11:
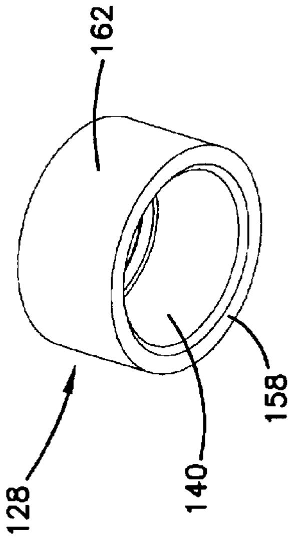
FIG. 11 is a front perspective view of the rear seal of FIG. 5.
Figure 12:
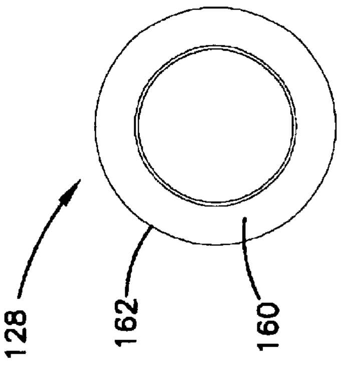
FIG. 12 is a rear view of the rear seal of FIG. 11.
Figure 14:
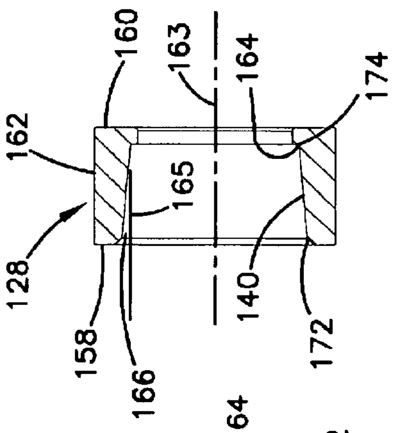
FIG. 14 is a cross-sectional side view of the rear seal of FIG. 11 taken along line A—A in FIG. 13.
Figure 13:
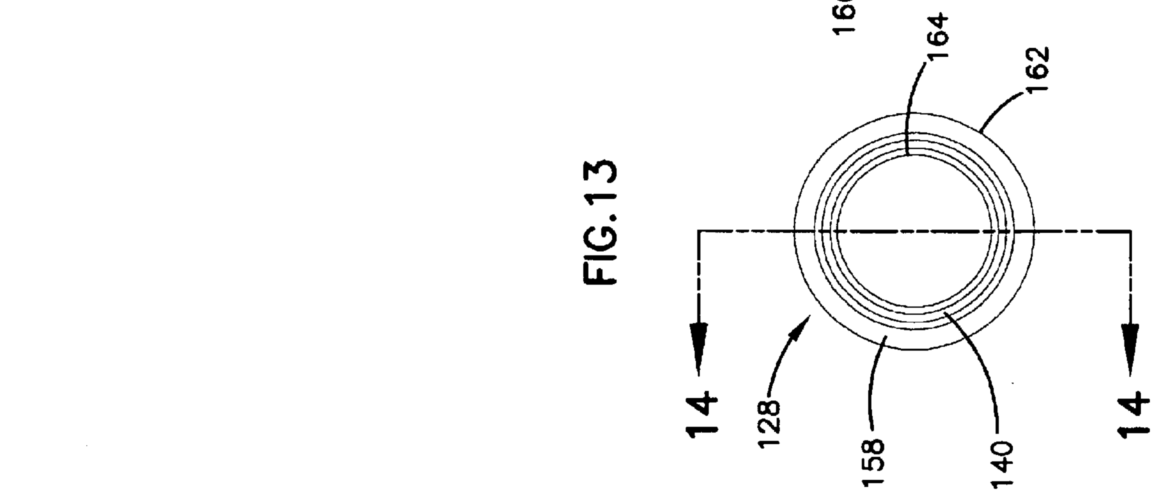
FIG. 13 is a front view of the rear seal of FIG. 11.
Figure 16:
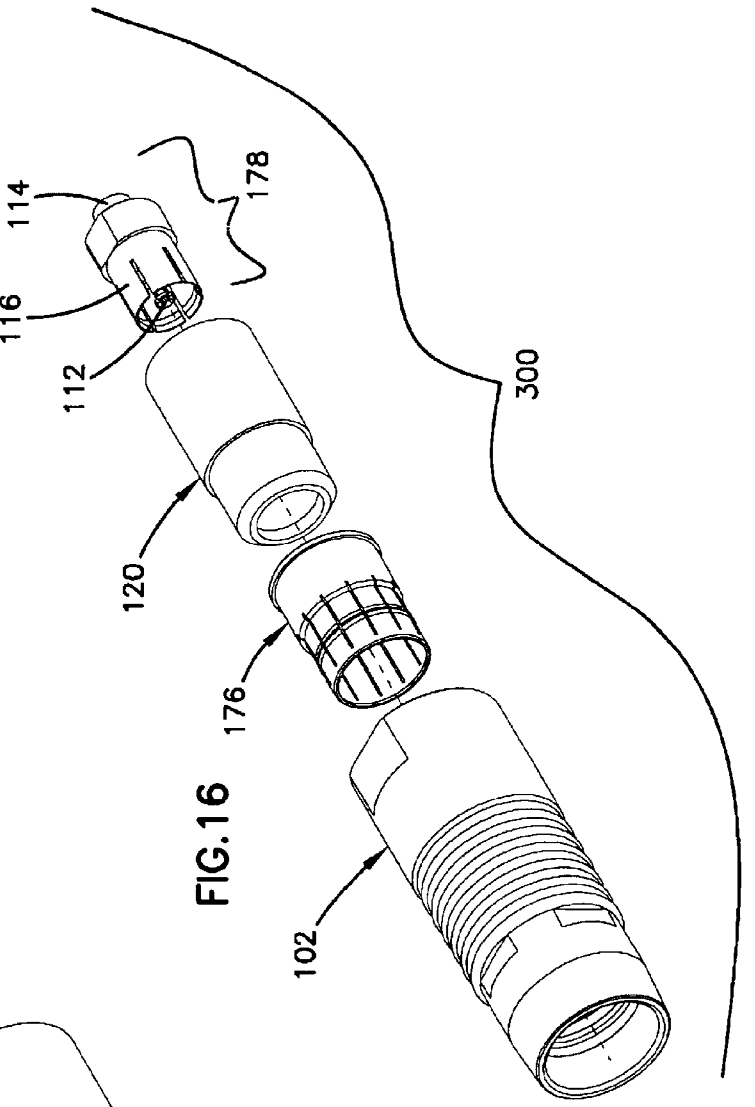
FIG. 16 is an exploded perspective view of the conversion kit of FIG. 15.
Figure 15:
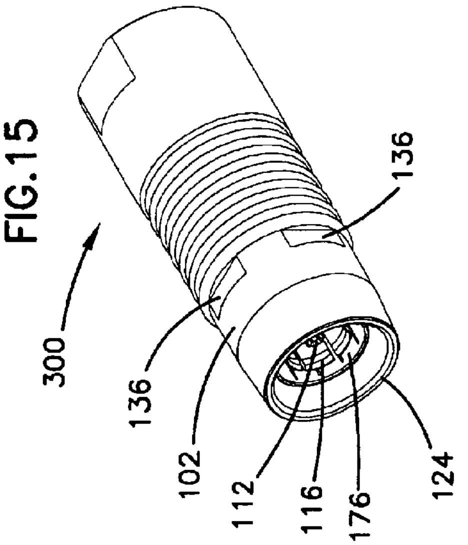
FIG. 15 is a perspective of an assembled first triaxial connector conversion kit according to the present invention.
Figure 17:
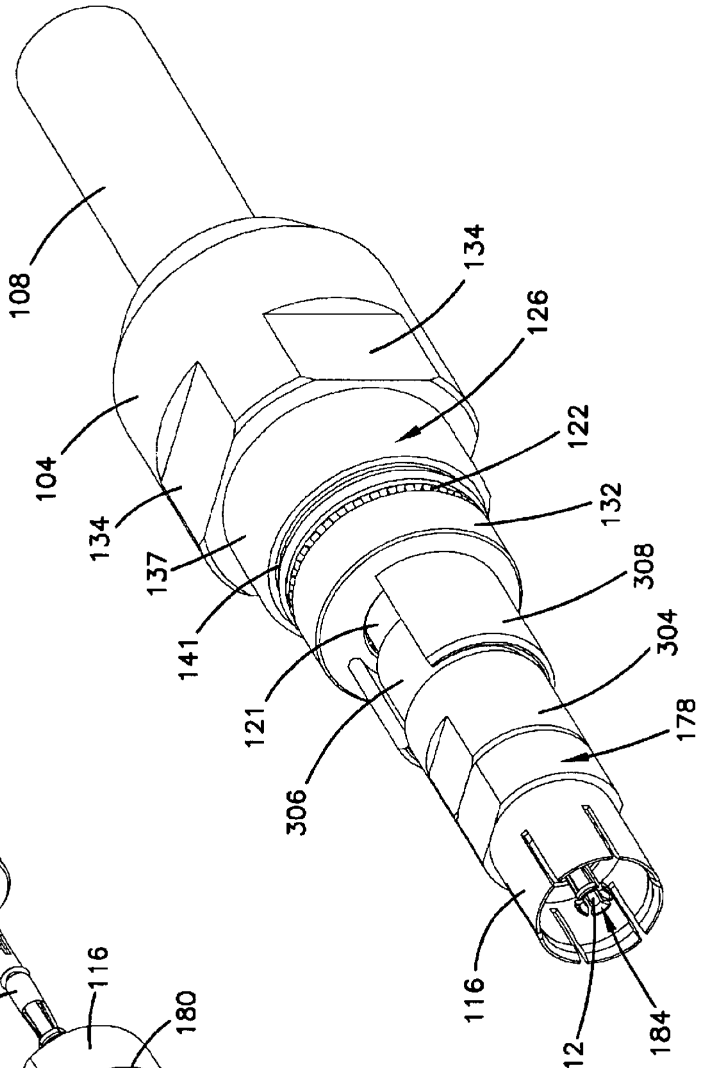
FIG. 17 is a perspective view of the front shell assembly of the conversion kit of FIG. 16 mounted to an internal assembly of a triaxial connector.
Figure 18:
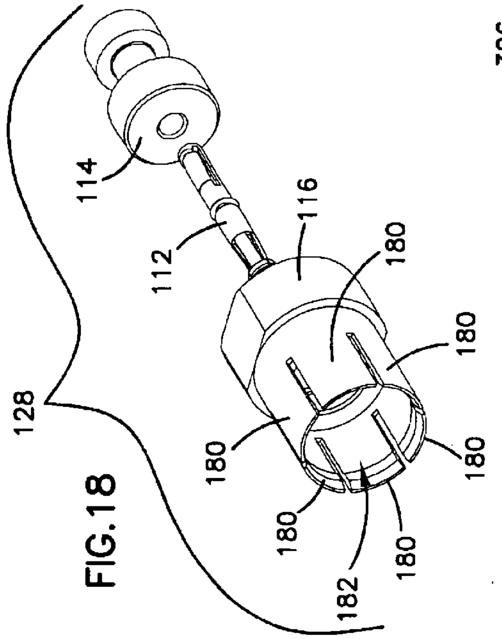
FIG. 18 is an exploded perspective view of the front shell assembly of FIG. 17.
Figure 20:
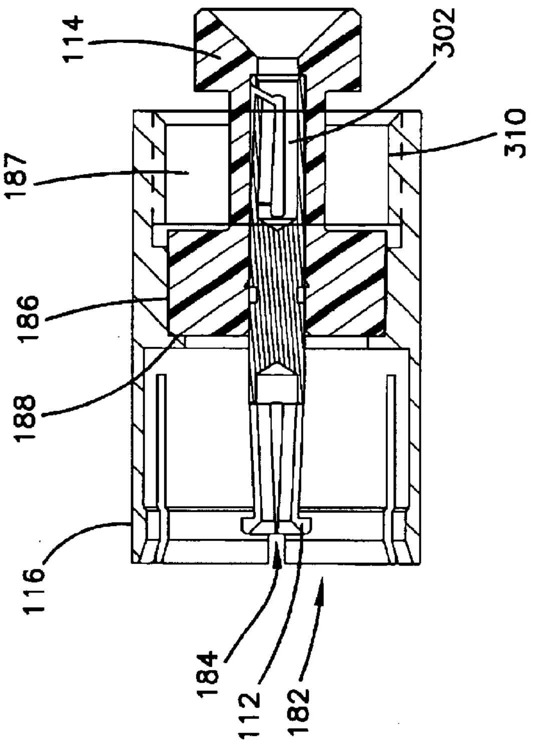
FIG. 20 is a cross-sectional view of the front shell assembly of FIG. 17 taken along line A—A of FIG. 19.
Figure 19:
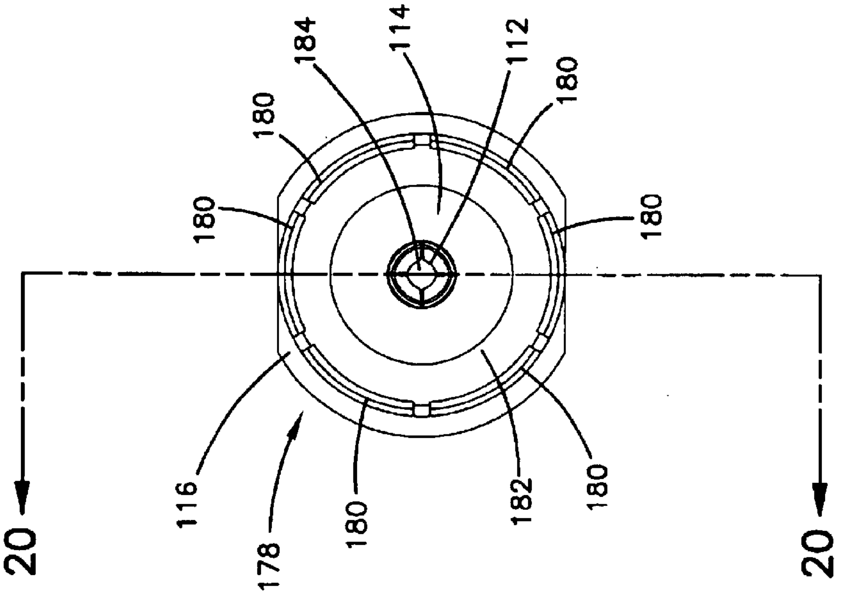
FIG. 19 is a front view of the front shell assembly of FIG. 17.
Figures 21, 22:
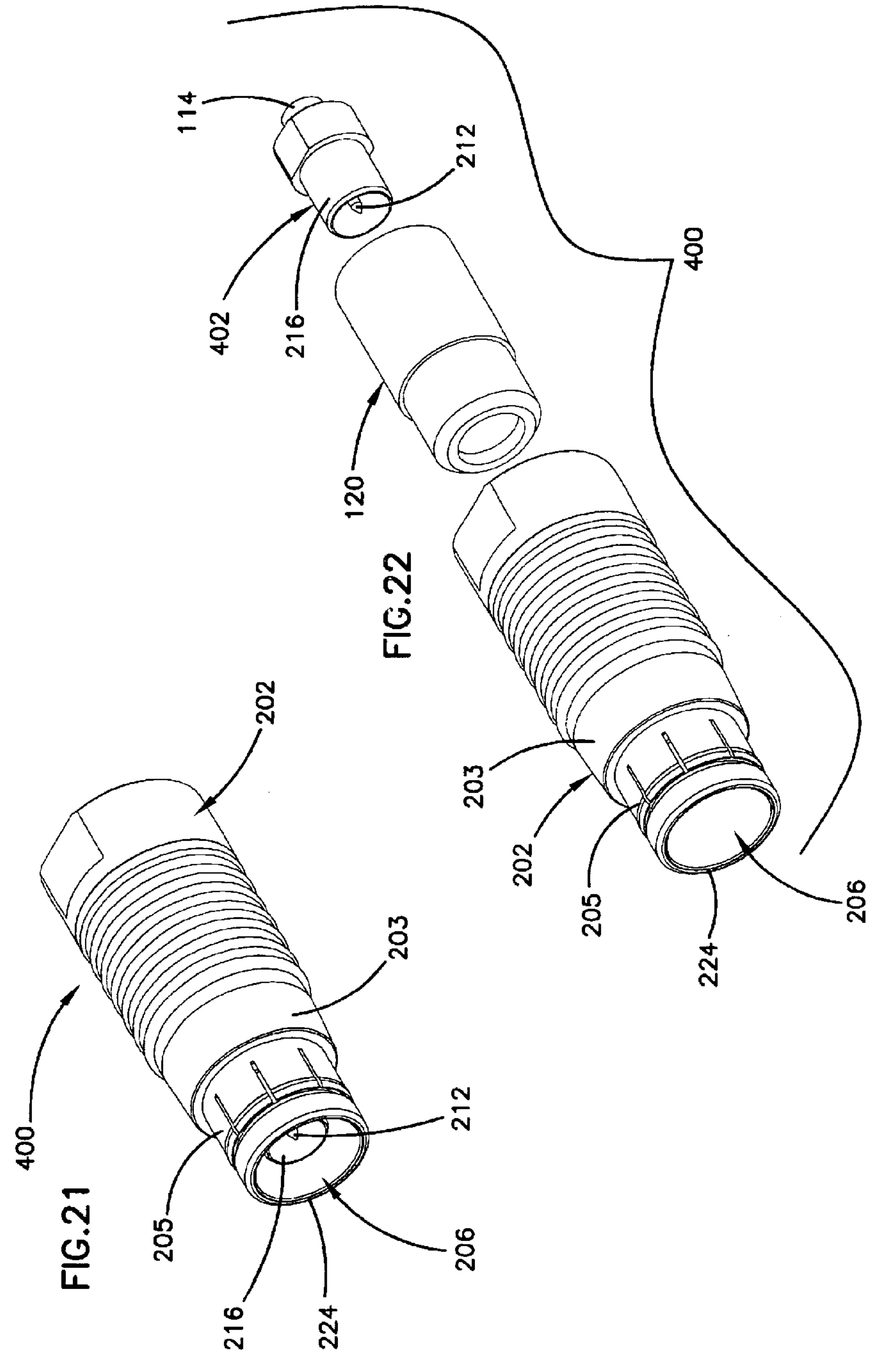
FIG. 21 is a perspective of an assembled second triaxial connector conversion kit according to the present invention.
FIG. 22 is an exploded perspective view of the conversion kit of FIG. 21.

Referring now to FIG. 5, further detail of the cooperation of endcap 104, threaded insert 126, rear seal 128 and collet 130 for mounting connectors 100 and 200 to cable 108 is shown. On an end of threaded insert 126 away from endcap 104 is shown center conductor 109 of cable 108. Center conductor 110 of connector 100 or 200 fits about center conductor 109 and is electrically insulated from first coaxial conductor 118 by middle dielectric 111. In turn, first coaxial conductor 118 is electrically insulated from second coaxial conductor 122 by inner jacket 121. To mount a connector 100 or 200 to cable 108 as part of a process of terminating cable 108, endcap 104 is first placed about cable 108, followed in turn by rear seal 128, collet 130 and threaded insert 126. An inner surface 138 of endcap 104 engages rear seal 128 as endcap 104 and threaded insert 126 are threadably engaged, urging rear seal 128 over collet 130. An inner wall 140 of rear seal 128 is angled as shown in the FIGS. (and described in further detail below) and an outer surface 142 of collet 130 is similarly angled as shown in the FIGS. (and described in further detail below). Inner wall 140 and outer surface 142 cooperate to compress collet 130 about cable 108 as endcap 104 is drawn toward threaded insert 126.

Second coaxial conductor 122 is electrically connected to threaded insert 126 by bending back second conductor 122 against threaded insert and placing ground washer 132 about the bent over portion of conductor 122. Additional details regarding the general process of terminating cable 108 to a connector 100 or 200 are described in above-referenced U.S. Pat. Nos. 5,967,852 and 6,109,963, the disclosures of which are incorporated herein by reference.

During the process of installing connectors to coaxial transmission cables, a portion of the connector structure is tightened about the outer jacket of the cable. This portion of the structure adds to the strength and integrity of the physical connection of the connector and the cable. The process of tightening the structure against the outer jacket of the cable should secure the cable without causing damage to the cable and the conductors within the cable.

Referring now to FIGS. 6 through 10, collet 130 is shown. Collet 130 includes an end 144 which is directed toward threaded sleeve 126 and an end 148 which is directed toward endcap 104, when collet 130 is used to secure a connector 100 or 200 to cable 108. Extending from end 144 toward end 148 are first slots 146, which traverse some of a distance between end 144 and end 148 and extend from an inner wall 154 to outer surface 142. Extending from end 148 toward end 144 are second slots 150, which traverse some of a distance between end 148 and end 144 and extend from an inner wall 154 to outer surface 142. In the illustrated embodiment, slots 146 and 150 are equal in number and equally spaced apart about a circumference of collet 130. Four each of slots 146 and 150 are shown, and it is anticipated that more or fewer slots 146 and 150 could be used in accordance with the present invention.

Inner wall 154 includes a series of ridges 156 to improve the ability of collet 130 to grip cable 108. Outer surface 142 defines an angle 152 with respect to line 153, which is parallel to a central axis 151 and offset from axis 151 by a maximum diameter of end 144. As shown, angle 152 is about 5 degrees, although it is anticipated that other angles may be used.

Collet 130 is preferably made of a material such as brass or other similar material which will react in the same manner to compression by rear seal 128 as described below.

Referring now to FIGS. 11 through 14, rear seal 128 is shown. Rear seal 128 includes an outer wall 162, an end 160 which engages inner surface 138 of endcap 104 and an end 158 which is directed toward threaded insert 126 when rear seal 128 is used to compress collet 130 to secure a connector 100 or 200 to cable 108. Inner wall 140 defines an angle 166 with respect to a line 165, which is parallel to a central axis 163 and offset from axis 163 by a maximum diameter of inner stop 164. Inner stop 164 is a ledge defining an end to inner wall 140 and providing a stop for collet 130.

Angle 166 is approximately the same as angle 152. A narrow end 168 of collet 130 is smaller than a wide end 172 of inner wall 140 of rear seal 128 but larger than a narrow end 174. A wide end 170 of collet 130 is smaller than wide end 172. As endcap 104 urges end 160 of rear seal toward threaded insert 126, inner wall 140 engages outer surface 142 and the cooperation of angles 152 and 166 and slots 146 and 150 allows collet 130 to be compressed within rear seal 128 to a smaller diameter. As collet 130 is compressed into a smaller diameter, inner wall 154 and ridges 156 are compressed into a smaller diameter as well, and inner wall 154 and ridges 156 engage cable 108, a shown in FIGS. 3 and 4.

When rear seal 128 is placed about collet 130, collet 130 is urged inward, forcing the material in collet 130 to deform and slots 146 and 150 to narrow. The arrangement of slots 146 and 150 allows inner wall 154 to maintain a uniform diameter from end 144 to end 148, as slots 146 and 150 narrow as collet 130 is compressed. Rear seal 128 and collet 130 combine to apply uniform pressure to cable 108 as collet 130 is compressed. A minimum diameter of inner wall 154 may be limited by limiting the amount of compression rear seal 128 applies to collet 130. Compression of collet 130 may be limited by controlling the width of slots 146 and 150, by inner stop 164 engages narrow end 168 of collet 130, or by setting a torque limit to the amount of force that may be applied to endcap 104 urging rear seal about collet 130.

There are several different known styles of connectors used to connect to the center conductor and other conductors within a coaxial cable. Connectors of one style may not physically compatible with connectors of another format. This means, for example, that a cable with a first style of connector may not be usable with a cable having a second style of connector, and vice versa. For example, connectors 100 and 200 mate with each other. However, connectors 100 and 200 do not mate with the connectors of U.S. Pat. Nos. 5,967,852 and 6,109,963, noted above. The mating ends do not physically fit together.

Referring now to FIGS. 15 through 26, conversion kits 300 and 400 are shown. Conversion kit 300 allows second connector 200 to be converted to a first connector 100, and conversion kit 400 allows first connector 100 to be converted to a second connector 200. It is anticipated that conversion kits 300 and 400 can also be adapted to work with coaxial or triaxial connectors of other styles or gender in a manner similar to that described below. Kits 300 and 400 can be used to convert the connectors of U.S. Pat. Nos. 5,967,852 and 6,109,963 to connectors of a different style, like connectors 100 and 200, without requiring cutting and reterminating the cable.

Referring now to FIGS. 15 to 20, included in conversion kit 300 are front outer body 102, ground spring 176, outer insulator 120 and a front shell assembly 178. Front shell assembly 178 includes center conductor 112, center conductor insulator 114 and front shell 116. Front shell 116 includes several longitudinally extending fingers 180 cooperating to define an opening 182 for receiving mating front shell 216. As shown in the FIGS., there are six fingers 180. It is anticipated that more or fewer fingers 180 may be used. Center conductor 112 defines an opening 184 for receiving a mating center conductor 212, and an opening 302 for receiving center conductor pin 110. Front shell assembly 178 is selectively removably mounted to a rear shell 304. Rear shell 304 is electrically connected to first coaxial conductor 118 and held to cable 108 by crimp sleeve 306, which is crimped about inner jacket 121. Intermediate insulator 308 fits about crimp sleeve 308 between ground washer 132 and rear shell 304, and insulates those parts from each other, to prevent electrically connecting first coaxial conductor 118 and second coaxial conductor 122 through connector 100.

Front shell 116 includes an inner wall 186 defining a region 187 for receiving insulator 114. Region 187 has an inner shoulder 188 to stop insertion of insulator 114 at an appropriate depth. Region 187 also includes a threaded portion 310 to permit selectively detachable mounting to rear shell 304. Other types of selectively detachable mounting approaches may also be used with the present invention, such as bayonet mounting.

Figure 23:
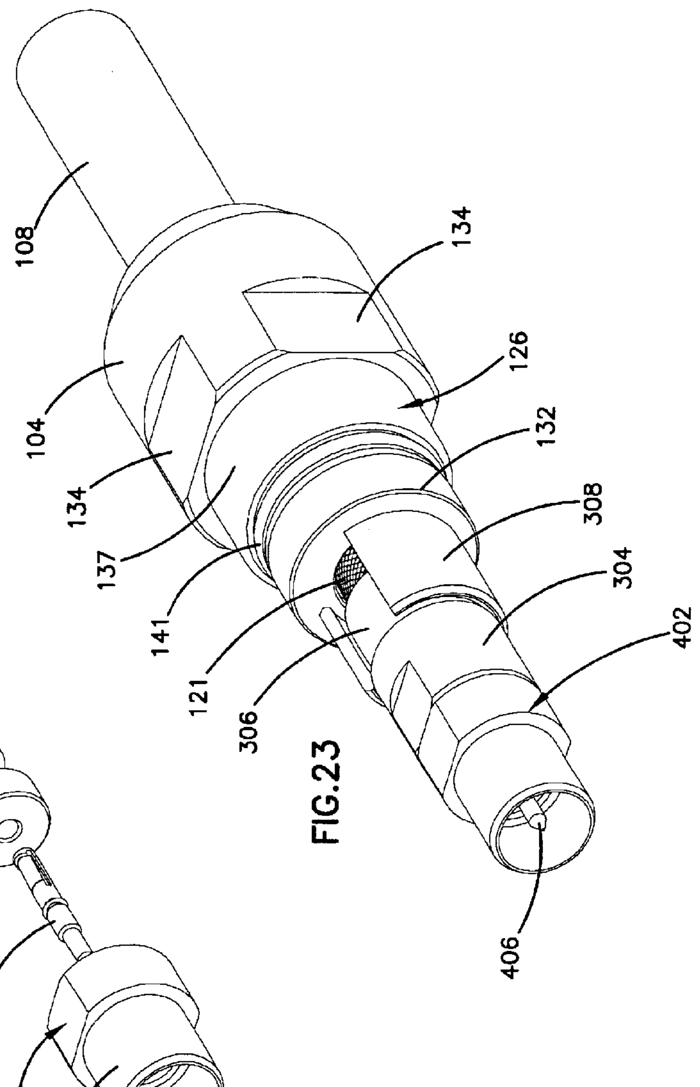
FIG. 23 is a perspective view of the front shell assembly of the conversion kit of FIG. 22 mounted to an internal assembly of a triaxial connector.
Figure 24:
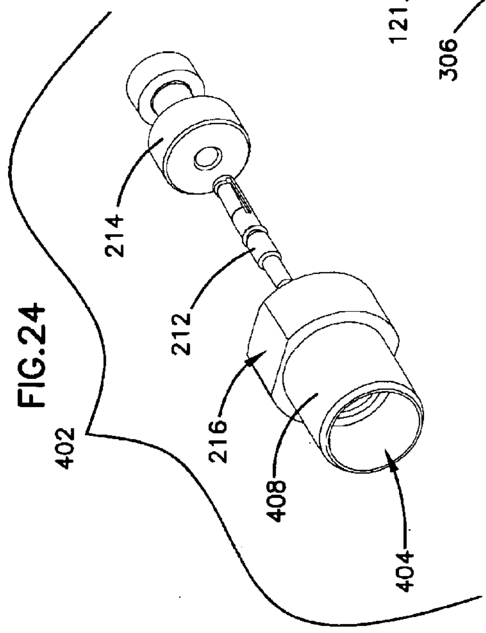
FIG. 24 is an exploded perspective view of the front shell assembly of FIG. 22.
Figure 26:
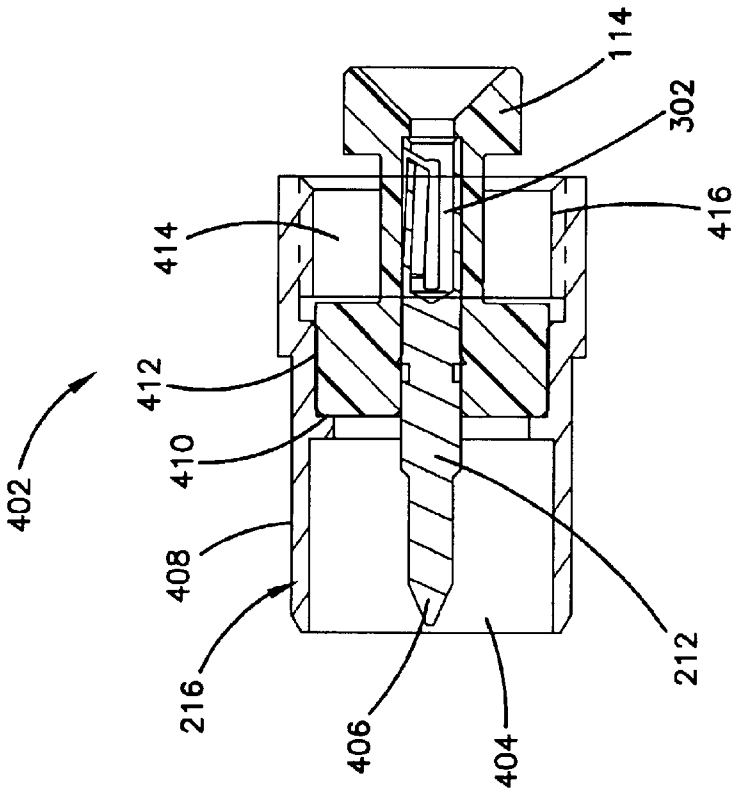
FIG. 26 is a cross-sectional view of the front shell assembly of FIG. 22 taken along line A—A of FIG. 25.
Figure 25:
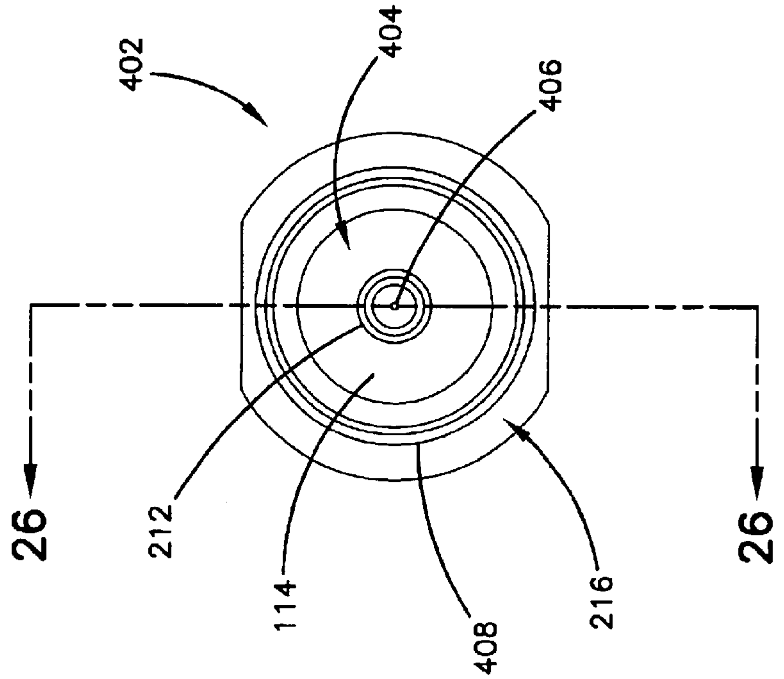
FIG. 25 is a front view of the front shell assembly of FIG. 22.

Referring now to FIGS. 21 to 26, included in conversion kit 400 are front outer body 202, outer insulator 120 and front shell assembly 402. Front shell assembly 402 includes center conductor 212, insulator 114 and front shell 216. Front shell 216 includes a tubular portion 408 defining an opening 404 for insertion into a mating front shell 116. Center conductor 212 includes a front end 406 for insertion into a mating center conductor 112, and an opening 302 for receiving center conductor pin 110. Front shell assembly 402 mounts to rear shell 304 in a similar manner to front shell assembly 178 and the remainder of connector 100 or 200 shown in FIG. 23 is the same as that shown in FIG. 17.

Front shell 216 includes an inner wall 412 defining a region 414 for receiving insulator 114. Region 414 has an inner shoulder 410 to stop the insertion of insulator 114 at an appropriate depth. Region 414 also includes a threaded portion 416 to permit selectively detachable mounting to rear shell 304. Other types of selectively detachable mounting approaches may also be used with the present invention, such as bayonet mounting.

Figure 27:
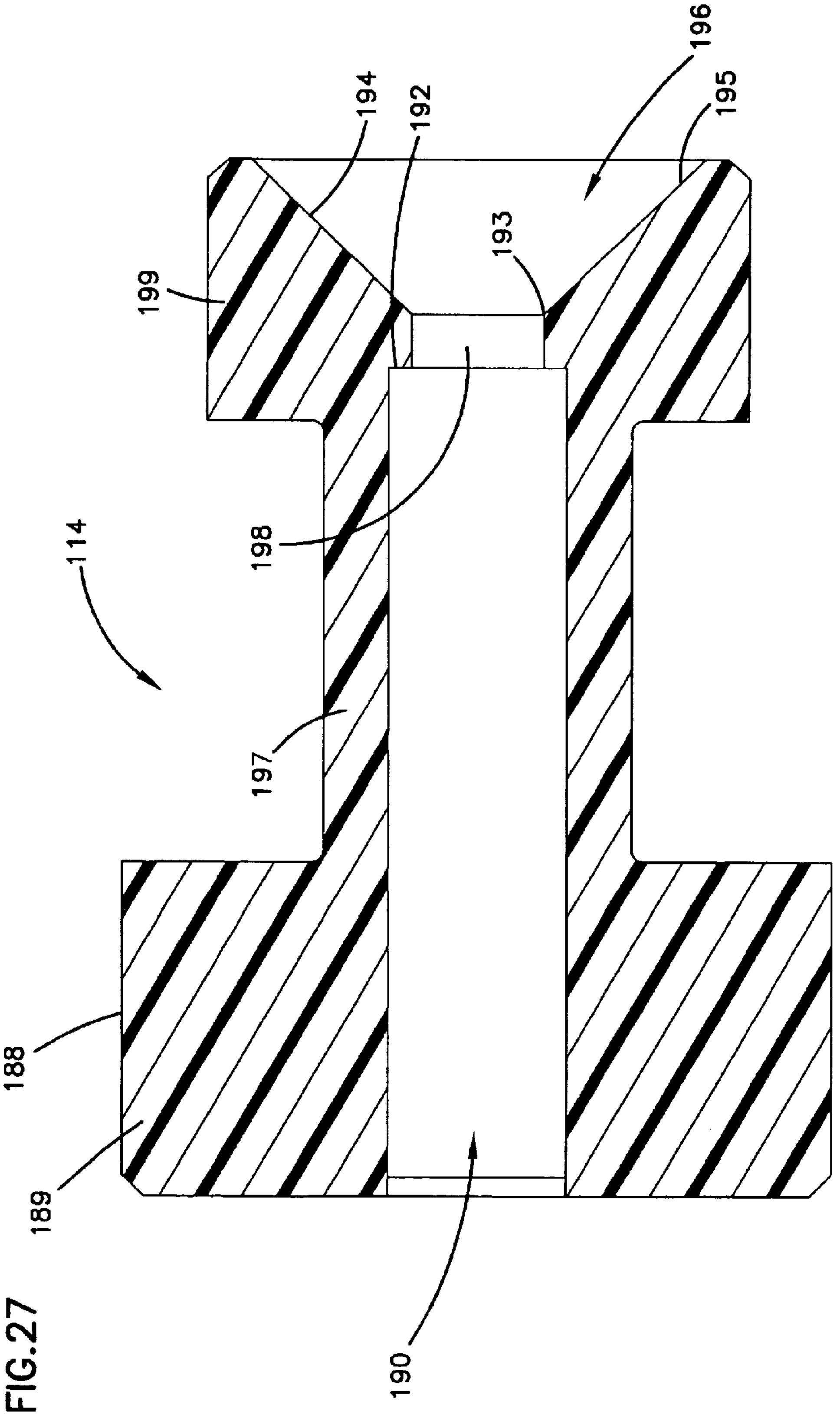
FIG. 27 is a cross-sectional view of the center conductor insulator of the front shell assemblies of the triaxial connector conversion kits of FIGS. 15 and 21.

Referring now to FIG. 27, additional detail of insulator 114 is shown. Insulator 114 includes a central channel 190 for receiving center conductor 112 or center conductor 212. A shoulder 192 within channel 190 provides a positive stop for a center conductor inserted into channel 190 and stops insertion at an appropriate depth. An outer wall 188 defines a diameter slightly larger than the inner diameter defined by either inner wall 412 of front shell 216 or inner wall 186 of front shell 116, permitting insulator 114 to be firmly held within either region 414 or 187, respectively. It is anticipated that press fitting insulator 114 into a front shell 216 or 116 will firmly mount insulator 114 within region 414 or 187 against shoulder 410 or 188, respectively. Insulator 114 is a one-piece insulator made of an electrically insulative material such as Teflon or a similar material. It is anticipated that insulator 114 may be made by a variety of methods, including machining.

Shoulder 192 within channel 190 defines an opening 198 to permit center conductor pin 110 to enter into opening 302 and make electrical contact with either center conductor 112 or 212. Centering region 196 provides an entry into opening 198 to guide center conductor pin into opening 302. Centering region 196 includes a sloped wall 194 defining a wider outer edge 195 and a narrower inner edge 193, which is the same size as opening 198. The funnel shape defined by centering region 196 aids in the insertion of a center conductor pin 110 which may have been placed or moved off-center by forcing center conductor pin into alignment with opening 302. Shaft portion 197 of insulator 114 helps ensure that an off-center center conductor pin 110 within opening 302 does not force any portion of center conductor 112 or 212 into contact with front shell 116 or 216, respectively. Shaft portion 197 is narrower than a rear portion 199 and a front portion 189 to provide for improved impedance characteristics when insulator 114 is incorporated into a telecommunications connector.

Figures 28, 29, 30, 31, 32:
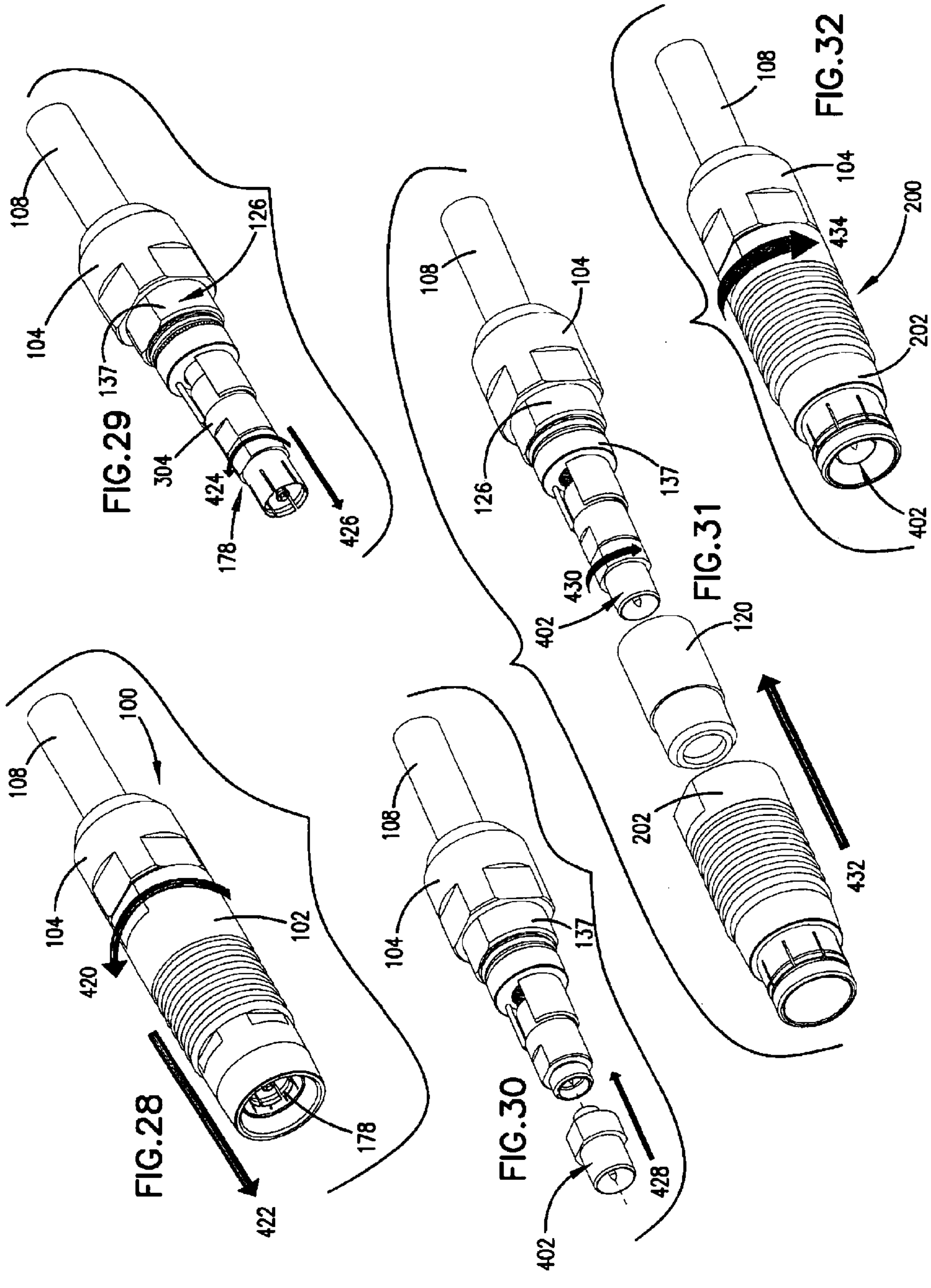
FIG. 28 is a perspective view of a connector during an initial step of a first conversion procedure according to the present invention, with the arrows showing the direction of movement for the removal of the front connector body.
FIG. 29 is a perspective view of the connector of FIG. 28 during a later step of the conversion process, with the arrows showing the direction of movement for the removal of the front shell assembly.
FIG. 30 is a perspective view of the connector of FIG. 29 during a later step of the conversion process, with the arrows showing the direction of movement for the replacement of the front shell assembly.
FIG. 31 is a perspective view of the connector of FIG. 30 during a later step of the conversion process, with the arrows showing the direction of movement for the replacement of the front connector body.
FIG. 32 is a perspective view of the connector of FIG. 31 during a later step of the conversion process, with the arrows showing the direction of movement for securing the replacement front connector body.

Referring now to FIGS. 28 through 32, a sequence of steps for converting from connector 100 to connector 200 are shown. Beginning with FIG. 28, front outer body 102 is removed from connector 100 by rotating in a direction 420 and then removing front outer body 102 in a direction 422. Within front outer body 102 are outer insulator 120 and ground spring 176. In FIG. 29, with front outer body 102 removed, front shell assembly 178 is removed from rear shell 304 by rotating in a direction 424 and removing front shell assembly 178 in a direction 426. Front shell assembly 402 is then mounted to rear shell 304 by inserting in a direction 428 in FIG. 30 and rotating in a direction 430 in FIG. 31. Outer insulator 120 and outer body 202 are then placed about front shell assembly 402 in a direction 432 in FIG. 31 and secured by rotating in a direction 434 in FIG. 32. Connector 100 from FIG. 28 has been converted to connector 200 in FIG. 32. In this sequence, threaded sleeve 126 includes threads which engage threads within outer body 102 and outer body 202 in region 137. Other methods of attachment that permit selective detachability are also contemplated within the present invention.

From the step shown in FIG. 30, a different connector end like the ends of U.S. Pat. Nos. 5,967,852 and 6,109,963 can be used, if desired. Further, kit 400 can be sued to convert the connectors of U.S. Pat. Nos. 5,967,852 and 6,109,963 to a connector that mates with connector 100.

Figures 33, 34, 35, 36, 37:
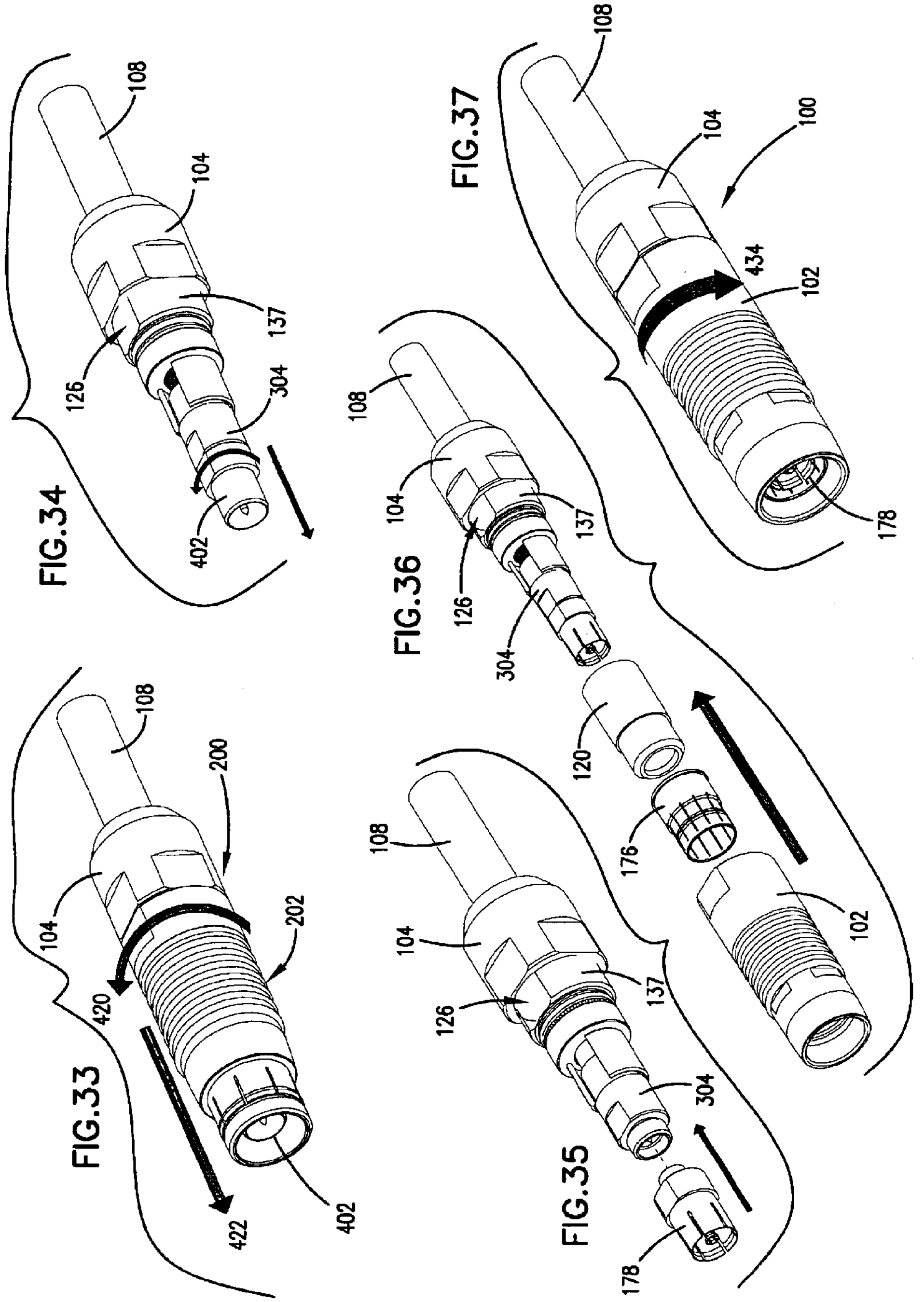
FIG. 33 is a perspective view of a connector during an initial step of a second conversion process according to the present invention, with the arrows showing the direction of movement for the removal of the front connector body.
FIG. 34 is a perspective view of the connector of FIG. 33 during a later step of the conversion process, with the arrows showing the direction of movement for the removal of the front shell assembly.
FIG. 35 is a perspective view of the connector of FIG. 34 during a later step of the conversion process, with the arrows showing the direction of movement for the replacement of the front shell assembly.
FIG. 36 is a perspective view of the connector of FIG. 35 during a later step of the conversion process, with the arrows showing the direction of movement for the replacement of the front connector body.
FIG. 37 is a perspective view of the connector of FIG. 36 during a later step of the conversion process, with the arrows showing the direction of movement for securing the replacement front connector body.

Referring now to FIGS. 33 through 37, a sequence of steps for converting from connector 200 to connector 100 is shown. Beginning with FIG. 33, front outer body 202 is removed from connector 200 by rotating in direction 420 and then removing front outer body 202 in direction 422. Within front outer body 202 is outer insulator 120. In FIG. 34, with front outer body 202 removed, front shell assembly 402 is removed from rear shell 304 by rotating in direction 424 and removing front shell assembly 402 in direction 426. Front shell assembly 178 is then mounted to rear shell 304 by inserting in direction 428 in FIG. 35 and rotating in direction 430 in FIG. 36. Outer insulator 120, ground spring 178 and outer body 102 are then placed about front shell assembly 402 in direction 432 and secured by rotating in direction 434. Connector 200 from FIG. 33 has now been converted into connector 100 in FIG. 37.

From the step shown in FIG. 35, a different connector end like the ends of U.S. Pat. Nos. 5,967,852 and 6,109,963 can be used, if desired. Further, kit 300 can be sued to convert the connectors of U.S. Pat. Nos. 5,967,852 and 6,109,963 to a connector that mates with connector 200.

Figure 38:
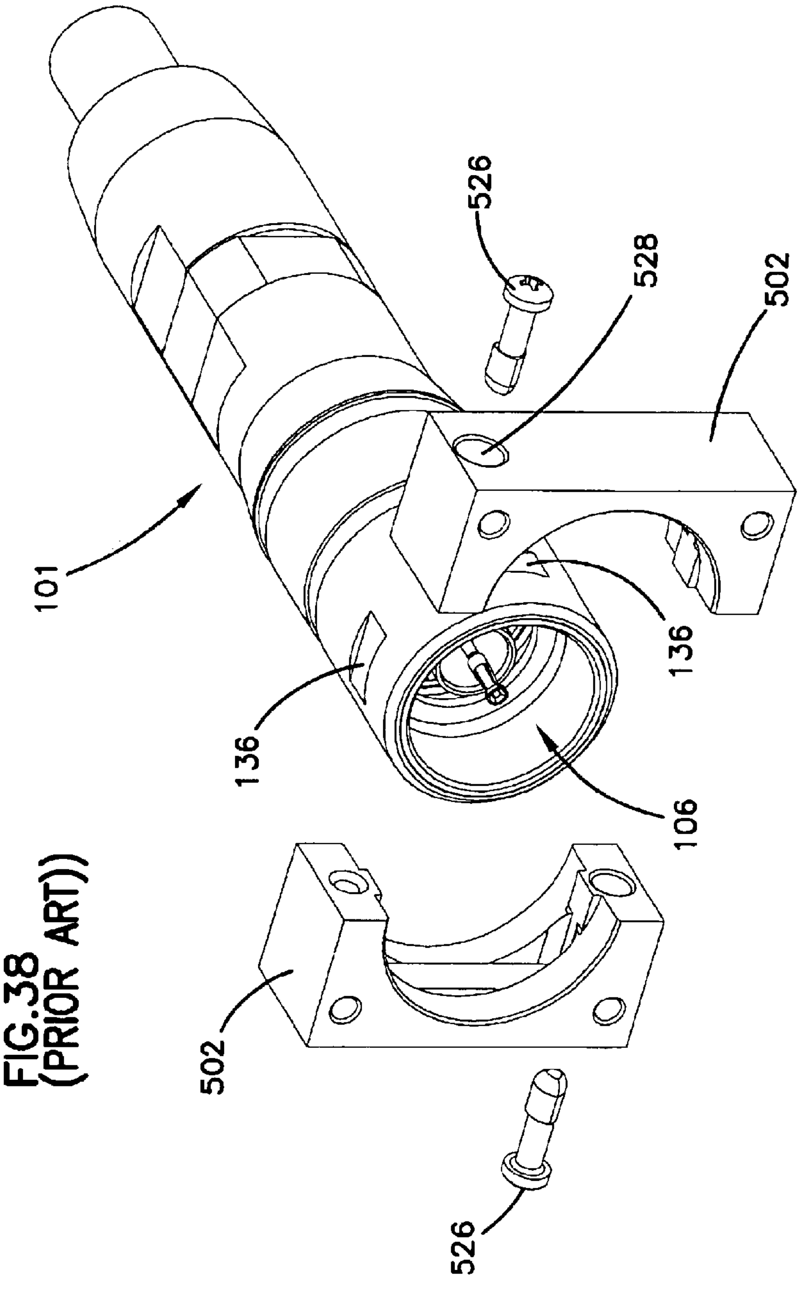
FIG.38 (PRIOR ART))
FIG. 38 is a front perspective exploded view of a prior art female telecommunications connector with a mounting yoke about the connector and a plate to which the mounting yoke is mounted.

Referring now to FIGS. 38 through 44, coaxial cable connectors may be mounted to panels or racks to provide better organization of a large group of connectors and also to keep the cables off the ground and away from environmental factors that may degrade the quality of the signal carried by the coaxial cable. FIG. 38 shows a prior art connector 101 which is a female connector and a pair of yoke halves 502 placed about opposing mounting flats 136 adjacent a mating opening 106. Connector 101 is a female connector conforming to a different style than connector 100. Mating opening 106 is like the mating end configuration of the female connector disclosed and shown in U.S. Pat. Nos. 5,967,852 and 6,109,963. Mounting arrangements including mounting yokes fit about connectors and then attached to mounting plates for connection to panel or rack are disclosed in U.S. Pat. Nos. 6,146,192 and 6,231,380, the disclosures of which are incorporated herein by reference.

Referring again to FIG. 38, yoke halves 502 are placed about connector 101 so that yoke halves 502 engage mounting flats 136 of connector 101 and secured in place by removable fasteners such as screws 526 inserted through openings 528. Yoke halves 502 are identical to one another. By engaging mounting flats 136, yoke halves 502 are temporarily fixed with connector 101 with regard to relative movement or rotation.

Figure 39:
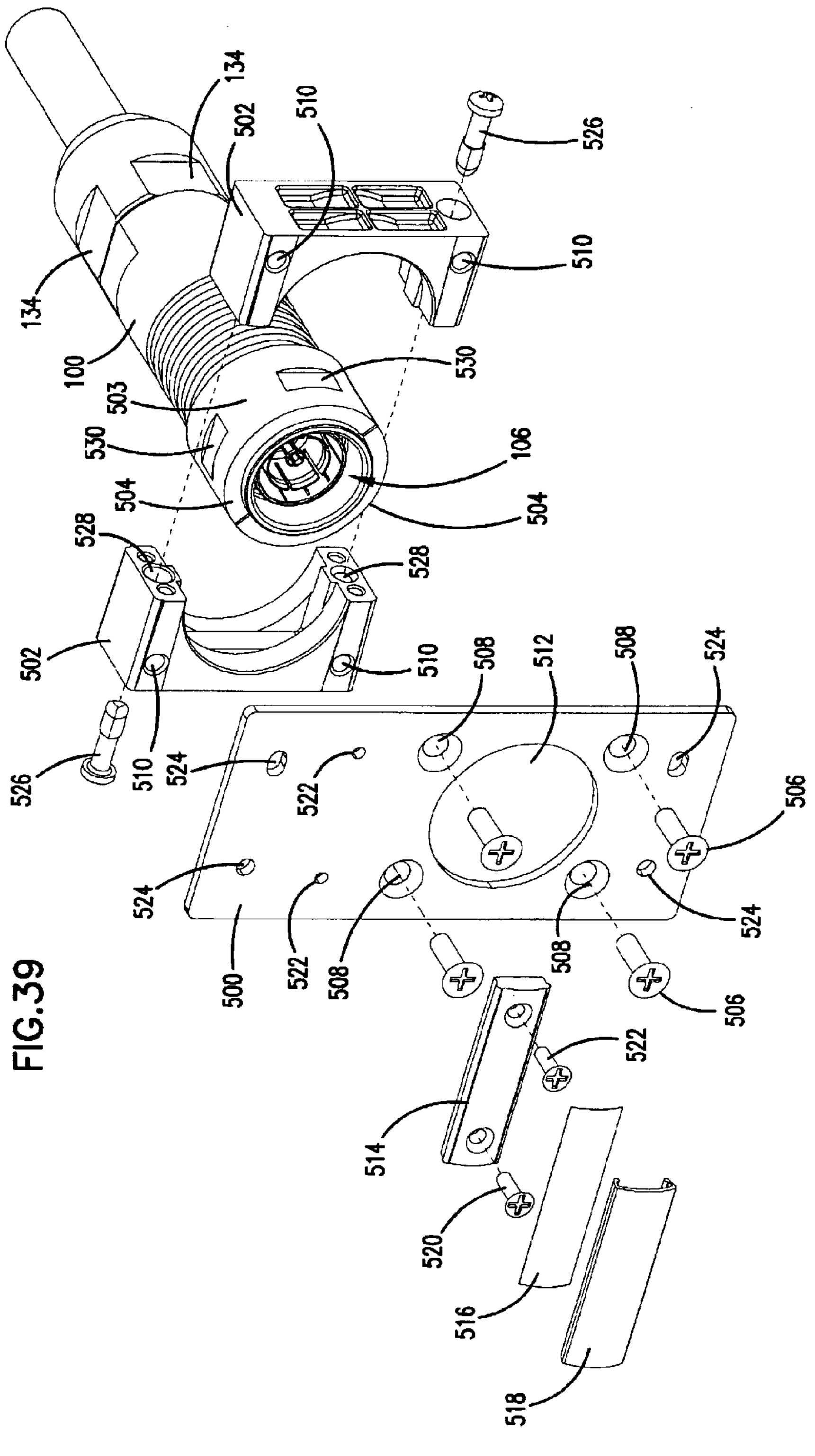
FIG. 39 is a front perspective exploded view of the telecommunications connector of FIG. 1 with an adapter about the connector, the mounting yoke and plate to which the mounting yoke is mounted of FIG. 38 about the adapter.

Referring now to FIG. 39, adapter halves 504 is shown for mounting a connector 100 to a plate 500 for mounting to a panel or bulkhead. Plate 500 can be mounted to a panel or a bulkhead as shown in U.S. Pat. Nos. 6,146,192 and 6,231,380. FIG. 38 shows connector 101 which can be mounted to a plate 500 in a manner consistent with the above-referenced patents.

Connector 100 defines a smaller diameter than connector 101. To permit yoke halves 502 to securely hold connector 100, an adapter 503 is provided. In the preferred embodiment, adapter 503 includes two identical adapter halves 504 placed about connector 100 and engaging mounting flats 136. Adapter halves 504 cooperate to provide an outer surface that matches the size and shape of mounting flats 136 of connector 101 and permits yoke halves 502 to be used to mount both connector 100 and connector 101.

Yoke halves 502 are placed about connector 100 about adapter halves 504 so that yoke halves 502 engage mounting flats 530 of adapter halves 504 and secured in place by removable fasteners such as screws 526 inserted through openings 528. Adapter halves 504 engage mounting flats 136 of connector 100 and temporarily fix connector 100 and adapter halves 504 with regard to relative movement or rotation. By engaging mounting flats 530, yoke halves 502 are temporarily fixed with connector 100 with regard to relative movement or rotation. Plate 500 can then be removably mounted to yoke halves 502 so that mating opening 106 of connector 101 is accessible through opening 512, and removable fasteners such as screws 506 are inserted through openings 508 and engage openings 510.

An indicia 516 may be mounted to plate 500 by fastening a rear holder 514 to plate 500 with fasteners 520 inserted through rear holder 514 and engaging openings 522. A front cover 518, made of an at least partially transparent material is placed over indicia 516 and engages rear holder 514 and traps indicia 516. Openings 524 are included in plate 500 to permit removable fasteners to be used to mount plate 500 to a panel or bulkhead.

Figure 40:
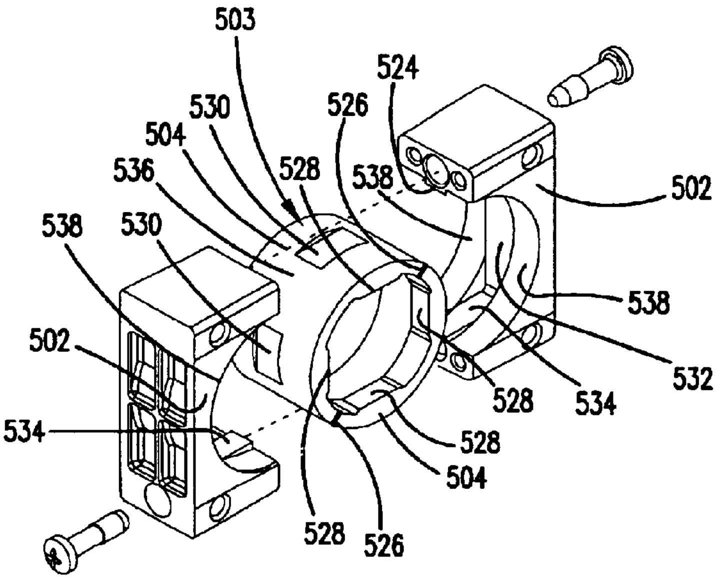
FIG. 40 is a front perspective exploded view of the adapter and mounting yoke of FIG. 39.
Figure 44:
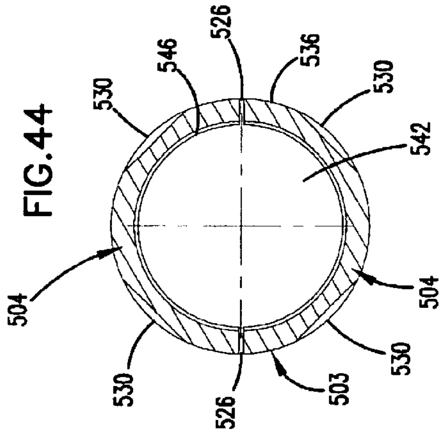
FIG. 44 is a cross-sectional view of the adapter of FIG. 39 taken along line A—A in FIG. 43.

FIG. 40 shows the orientation of adapter halves 504 and yoke halves 502 with respect to each other when positioned for assembly. Note that a split line 526 for adapter halves 504 is positioned offset from a line formed by yokes halves 502 when joined together. This offset as shown is approximately forty-five degrees to aid in assembly of connector 100 with adapter halves 504 and yoke halves 502. Other angles of offset may be used to achieve the same aid to assembly and it is anticipated that the present invention is workable with no angular offset as well.

Yoke halves 502 are described in detail in U.S. Pat. Nos. 6,146,192 and 6,231,380. Yoke halves 502 include a flat 532 along one side and partial flats 534 along a top and bottom. Partial flats 534 of each of a pair of yoke halves cooperate to form a continuous flat of the same size as flat 532 when two yoke halves are assembled. These flats 532 and 534 engage mounting flats 530 in an outer surface 536 of adapter halves 504. Mounting flats 530 are similarly sized to mounting flats 136 of a connector 101. In addition, outer surface 536 of adapter halves 504 defines a diameter that is similarly sized to connector 101. Yoke halves 502 include surfaces 538 on either side of flats 532 and 534 which cooperate to define a round inner surface similarly sized to both connector 101 and outer surface 536.

Referring now to FIGS. 40 through 44, each adapter half 504 includes an inner surface 546 which cooperate to form an opening 542 for receiving connector 100. Flats 528 are along inner surfaces 546 and equally spaced apart around opening 542. Flats 528 are sized to engage mounting flats 136 of connector 100 and located adjacent a first end 540 of adapter halves 504. Inner surfaces 546 adjacent a second end 544 cooperate to form a portion of opening 542 which is sized to fit about front outer body 102 of connector 100 adjacent mating opening 106.

Figure 43:
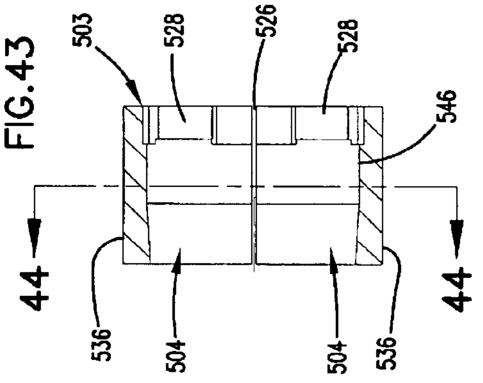
FIG. 43 is a cross-sectional view of the adapter of FIG. 39 taken along line B—B in FIG. 42.
Figure 41:
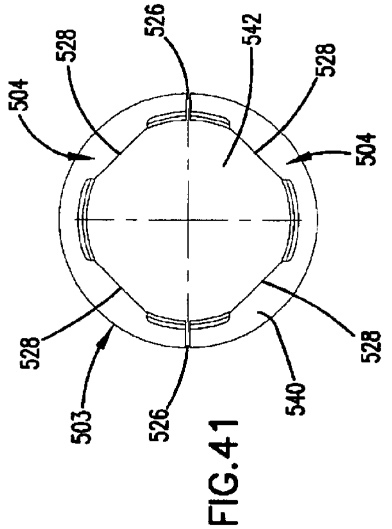
FIG. 41 is a front view of the adapter of FIG. 39.
Figure 42:
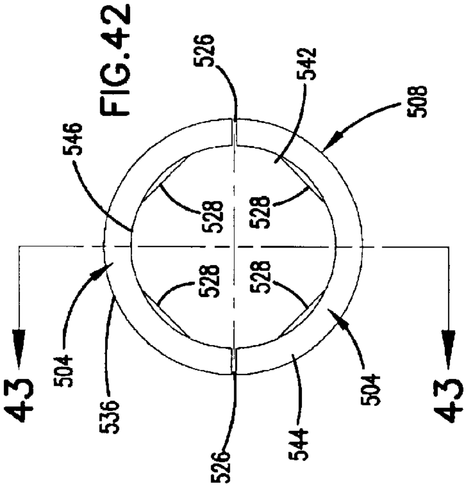
FIG. 42 is a rear view of the adapter of FIG. 39.

Referring now to FIGS. 1, 3 and 43, front outer body 102 between mounting flats 136 and mating opening 106 includes a non-tapered portion 548 and a tapered portion 550. Along inner surfaces 546 are a first section 554 adjacent flats 528 and a second section 552 opposite flats 528. First section 554 is sized to fit about non-tapered portion 548 and second section 552 is sized to fit about tapered portion 550. Other styles of connectors may not have a tapered portion of a front outer body adjacent a mating opening and mounting flats and it is anticipated that alternative embodiments of adapter halves 504 may be adapted to fit about these non-tapered connectors as well.

The tolerance for fitting about front outer body 102 by adapter halves 504 is such that with flats 528 engaging mounting flats 136 and second section 552 engaging tapered portion 550, adapter halves 504 are temporarily fixed with connector 100 with regard to relative movement or rotation, and adapter halves 504 can not be removed from connector 100 without separating along split line 526. Yoke halves 502 can then be placed about adapter halves 504 with flats 532 and 534 engaging mounting flats 530, which will serve to temporarily fix yoke halves with connector 100 with regard to relative movement or rotation. Plate 500 can then be mounted to yoke halves 502 to permit mounting of connector 100 to a panel as described in the above referenced patents. Alternatively, yoke halves 502 and adapter halves 504 can be used to mount connector 100 to an angled bracket for mounting to a panel as described in the above referenced patents.

The above specification, examples and data provide a complete description of the manufacture and use of the invention. Since many embodiments of the invention can be made without departing from the spirit and scope of the invention, the invention resides in the claims hereinafter appended.

What is claimed is:

1. A ring-shaped collet comprising:

an inner wall, an outer wall, a first end and a second end, the ends separated by a width of the collet;

at least two equally spaced apart slots from the inner wall to the outer wall extending from the first end toward the second end partially across the width, at least two equally spaced apart slots from the inner wall to the outer wall extending from the second end toward the first end partially across the width, the number of slots in the first end equal to the number of the slots in the second end and the slots from the first end being located generally equally between the slots from the second end;

the inner wall defining a diameter sized to receive a transmission line cable;

the outer wall having a diameter which tapers from a greatest diameter proximate the first end to a smallest diameter proximate the second end;

each of the slots in the second end closed off adjacent the first end by a portion of the first end extending from the inner wall to the outer wall; and the collet formed of a deformable material.

2. The ring-shaped collet of claim 1, wherein the deformable material is metal.

3. The ring-shaped collet of claim 2, wherein the deformable material is brass.

4. The ring-shaped collet of claim 1, wherein the inner wall includes ridges.

5. The ring-shaped collet of claim 1, wherein four slots extend from the first end toward the second end and four slots extend from the second end toward the first end.

6. The ring-shaped collet of claim 1, further comprising a ring-shaped rear seal sized to fit over the collet having an outer surface of generally uniform diameter and an inner surface which tapers from a greater diameter proximate a first end to a smaller diameter proximate a second end, the inner surface including a shoulder projecting inwardly from the inner wall defining a diameter smaller than the diameter of the second end of the collet and large enough to fit about the cable, the shoulder being spaced apart from the first end a distance less than the width of the collet.

7. A compression ring assembly for mounting a transmission line connector to a cable, the compression ring assembly comprising:

a ring-shaped collet formed of a deformable material having a first end and a second end, the ends separated by a width of the collet, at least two equally spaced apart slots through the collet extending from the first end toward the second end partially across the width, at least two equally spaced apart slots through the collet extending from the second end toward the first end partially across the width, number of slots in the first end equal to the number of the slots in the second end and the slots from the first end being located generally equally between the slots from the second end;

a ring-shaped rear seal sized to fit over the collet having an outer surface of generally uniform diameter and an inner surface which tapers from a greater diameter proximate a first end to a smaller diameter proximate a second end, the inner surface including a shoulder projecting inwardly from the inner wall defining a diameter smaller than the diameter of the second end of the collet and large enough to fit about the cable, the shoulder being spaced apart from the first end a distance less than the width of the collet;

a threaded sleeve sized to fit about the cable and having a shoulder; and an endcap having a cylindrical inner surface with a diameter sized to fit over the outer diameter of the rear seal and a ledge projecting inwardly from the inner surface defining a diameter smaller than the outer surface of the rear seal, the endcap threaded to engage the threads of the sleeve;

wherein the collet has a diameter smaller than the greater diameter of the inner surface of the rear seal and greater than the smaller diameter of the inner surface of the rear seal.

8. A ring-shaped collet comprising:

an inner wall, an outer wall, a first end and a second end, the ends separated by a width of the collet;

at least two equally spaced apart slots from the inner wall to the outer wall extending from the first end toward the second end partially across the width, at least two equally spaced apart slots from the inner wall to the outer wall extending from the second end toward the first end partially across the width, the number of slots in the first end equal to the number of the slots in the second end and the slots from the first end being located generally equally between the slots from the second end;

the inner wall defining a diameter sized to receive a transmission line cable;

the outer wall having a diameter which tapers from a greatest diameter proximate the first end to a smallest diameter proximate the second end;

the collet formed of a deformable material; and a ring-shaped rear seal sized to fit over the collet having an outer surface of generally uniform diameter and an inner surface which tapers from a greater diameter proximate a first end to a smaller diameter proximate a second end, the inner surface including a shoulder projecting inwardly from the inner wall defining a diameter smaller than the diameter of the second end of the collet and large enough to fit about the cable, the shoulder being spaced apart from the first end a distance less than the width of the collet.

* * * * *